US 11,441,626 B2

(12) United States Patent
Masuda

(10) Patent No.: US 11,441,626 B2
(45) Date of Patent: Sep. 13, 2022

(54) ELECTRIC LINEAR ACTUATOR AND ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 440 days.

(21) Appl. No.: 16/517,065

(22) Filed: Jul. 19, 2019

(65) Prior Publication Data

US 2019/0338817 A1 Nov. 7, 2019

Related U.S. Application Data

(63) Continuation of application No. PCT/JP2018/001709, filed on Jan. 22, 2018.

(30) Foreign Application Priority Data

Jan. 26, 2017 (JP) .............................. JP2017-011873

(51) Int. Cl.
*B60T 8/78* (2006.01)
*F16D 65/18* (2006.01)
(Continued)

(52) U.S. Cl.
CPC ............... *F16D 65/18* (2013.01); *H02K 7/06* (2013.01); *H02K 7/102* (2013.01);
(Continued)

(58) Field of Classification Search
CPC ............. H02P 2201/07; H02P 2201/09; B60T 13/741; B60T 2270/84; F16D 2121/24
See application file for complete search history.

(56) References Cited

U.S. PATENT DOCUMENTS 7,810,616 B2 10/2010 Nakazeki
9,225,284 B2 12/2015 Ried
(Continued)

FOREIGN PATENT DOCUMENTS

CN 101445059 A 6/2009
CN 105517865 A 4/2016
(Continued)

OTHER PUBLICATIONS

Extended European Search Report dated Sep. 11, 2020, in corresponding European Patent Application No. 18744948.3.
(Continued)

*Primary Examiner* — Nicholas J Lane

(57) ABSTRACT

Provided is an electric linear motion actuator that enables size reduction and cost reduction while increasing the instantaneous output of an electric motor. A control device (2) of the electric linear motion actuator includes: a motor driver (24) configured to control power supplied to a coil (4b) of an electric motor (4); a power storage unit (21) connected to a power supply device (3) and the motor driver (24); a current flow direction restriction unit (20) disposed between the power supply device (3) and the power storage unit (21), which causes current to pass only in a direction in which power is supplied from the power supply device (3); and a step-up unit (19) configured to step up voltage of the power supply device (3) and provide the stepped-up voltage to the power storage unit (21).

7 Claims, 8 Drawing Sheets

(51) Int. Cl.
*H02K 7/06* (2006.01)
*H02K 7/102* (2006.01)
*F16D 121/24* (2012.01)

(52) U.S. Cl.
CPC ...... *F16D 2121/24* (2013.01); *H02P 2201/07* (2013.01); *H02P 2201/09* (2013.01)

(56) References Cited

U.S. PATENT DOCUMENTS

| | | |
|---|---|---|
| 9,461,577 B2 | 10/2016 | Ried |
| 9,915,308 B2 | 3/2018 | Masuda |
| 2006/0066270 A1* | 3/2006 | Kumagai ............... B60T 13/741 318/139 |
| 2006/0180365 A1* | 8/2006 | Innami ................ B60K 7/0007 180/65.51 |
| 2008/0110704 A1 | 5/2008 | Nakazeki |
| 2009/0134853 A1 | 5/2009 | Suzuki et al. |
| 2009/0179627 A1* | 7/2009 | Innami ................... H02J 7/345 323/318 |
| 2015/0042255 A1 | 2/2015 | Ried |
| 2016/0087569 A1 | 3/2016 | Ried |
| 2016/0208871 A1* | 7/2016 | Masuda ............... B60T 13/741 |
| 2019/0135135 A1* | 5/2019 | Masuda ................ B60M 3/06 |

FOREIGN PATENT DOCUMENTS

| | | |
|---|---|---|
| CN | 105637270 A | 6/2016 |
| EP | 2 066 003 A2 | 6/2009 |
| JP | 6-169503 | 6/1994 |
| JP | 6-327190 | 11/1994 |
| JP | 2001-280384 A | 10/2001 |
| JP | 2003-205837 | 7/2003 |
| JP | 2005-261180 | 9/2005 |
| JP | 2006-194356 | 7/2006 |
| JP | 2007-151247 A | 6/2007 |
| JP | 2014-121993 | 7/2014 |
| JP | 2015-48037 | 3/2015 |
| WO | 2015/021360 A2 | 2/2015 |

OTHER PUBLICATIONS

International Search Report dated Apr. 24, 2018 in corresponding International Patent Application No. PCT/JP2018/001709.
English Translation by WIPO of the International Preliminary Report on Patentability dated Aug. 8, 2019 in corresponding International Patent Application No. PCT/JP2018/001709.
European Office Action dated Feb. 4, 2022 from European Application No. 18744948.3.
Chinese Office Action dated Jul. 4, 2022 from Chinese Application No. 201880008289.8.

* cited by examiner

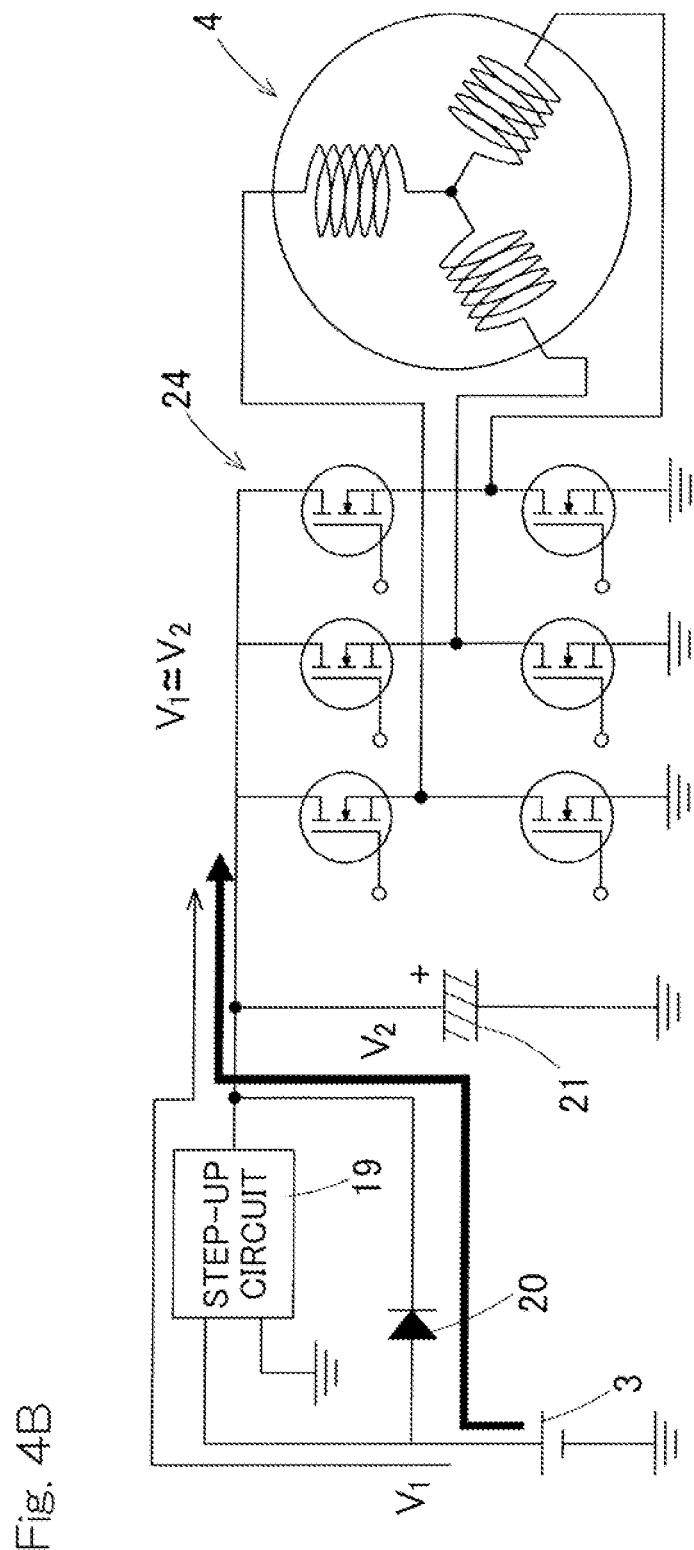

ELECTRIC LINEAR ACTUATOR AND ELECTRIC BRAKE DEVICE

CROSS REFERENCE TO THE RELATED APPLICATION

This application is a continuation application, under 35 U.S.C. § 111(a), of international application No. PCT/JP2018/001709, filed Jan. 22, 2018, which claims Convention priority to Japanese patent application No. 2017-011873, filed Jan. 26, 2017, the entire disclosure of which is herein incorporated by reference as a part of this application.

BACKGROUND OF THE INVENTION

Field of the Invention

The present invention relates to an electric linear motion actuator and an electric brake apparatus to be mounted to a vehicle or the like.

Description of Related Art

The following techniques have been proposed as electric actuators.
1. An electric brake actuator using an electric motor, a linear motion mechanism, and a speed reducer (Patent Document 1).
2. An electric actuator using a planetary roller mechanism and an electric motor (Patent Document 2).

RELATED DOCUMENT

Patent Document

[Patent Document 1] JP Laid-open Patent Publication No. H6-327190
[Patent Document 2] JP Laid-open Patent Publication No. 2006-194356

SUMMARY OF THE INVENTION

In electric brake apparatuses using the electric actuators of Patent Documents 1 and 2, during a normal braking operation, the only power consumption is mostly power that is consumed as motor copper loss, whereas, during, for example, a high-speed braking operation such as a panic braking operation or an antilock brake system (ABS) operation, great power is instantaneously required for operating a motor with high output.

In order to increase current to increase the output to meet the requirement, a large and expensive harness, circuit element, and the like are needed, and thus a problem may arise in terms of size, cost, weight, and the like. On the other hand, in order to increase drive voltage, a special power supply device such as a battery or a DC/DC converter needs to be provided, and thus a problem may arise in terms of cost and the like. In particular, in a case where a step-up circuit is used as the special power supply device, current on the primary side may be exceedingly large, and thus a problem may arise in terms of the sizes and the costs of a wire and a circuit element of the DC/DC converter.

An object of the present invention is to provide an electric linear motion actuator and an electric brake apparatus that enable size reduction and cost reduction while increasing the instantaneous output of an electric motor.

In the following description, the reference characters in the embodiments are used for convenience sake in order to facilitate the understanding.

An electric linear motion actuator according to the present invention includes: an electric motor 4; a linear motion mechanism 6 configured to convert rotational motion of the electric motor 4 into linear motion of a linear motion unit 14 via a rotation input/output shaft; and a control device 2 connected to a power supply device 3 for DC power, the control device 2 being configured to drive the electric motor 4, the control device 2 including
a motor driver 24 configured to control power to be supplied to a coil 4b of the electric motor 4,
a power storage unit 21 connected between the power supply device 3 and the motor driver 24,
a current flow direction restriction unit 20 disposed between the power supply device 3 and the power storage unit 21, the current flow direction restriction unit 20 being configured to cause current to pass only in a direction in which power is supplied from the power supply device 3, and
a step-up unit 19 configured to step up voltage from the power supply device 3 and provide the stepped-up voltage to the power storage unit 21.

The power storage unit is connected to the motor driver, in parallel to the power supply device (specifically, the power supply including the step-up unit). However, the power storage unit may be connected to the motor driver, in series with the power supply device.

In this configuration, the motor driver 24 controls power to be supplied to the coil 4b of the electric motor 4, thereby driving the electric motor 4. The power storage unit 21 stores power supplied from the power supply device 3. The step-up unit 19 steps up voltage from the power supply device 3 and causes the power storage unit 21 to store charges, so that DC voltage to be supplied to the motor driver can be stepped up so as to be higher than the voltage of the power supply device 3 under a state where the electric motor 4 is continuously in a non-operating state or in an operation with the power consumption of the electric motor 4 being smaller than a maximum output from the step-up unit 19.

When a manipulation that requires the electric motor 4 to perform a high-output operation is performed through an operation mechanism or the like, power is supplied mainly from the power storage unit 21 with stepped-up voltage via the motor driver 24 to the electric motor 4. Since the voltage from the power storage unit 21 can be thus stepped up so as to be higher than the voltage of the power supply device 3 and supplied to the motor driver 24, an instantaneous maximum output for the electric motor 4 can be increased without increasing motor current, as compared to a case where the step-up is not performed. Consequently, no expensive member such as a harness or a circuit element for large current required for increasing the motor current is necessary, whereby size reduction and cost reduction are enabled. In addition, to the electric motor 4 and the control device 2 power can also be directly supplied from the power supply device 3 without being supplied via the step-up unit 19, and thus the output of the step-up unit 19 can be made smaller than that in a conventional art example that uses a power supply device of which the voltage is always stepped up by a DC/DC converter or the like. Accordingly, the size and the cost of the step-up unit can be made smaller than those in the conventional art example, whereby the size and the cost of the entire actuator can be reduced.

The step-up unit 19 may include: a constant current restriction section 19a configured to restrict, when output current to be outputted from the step-up unit 19 is greater than a set value, the output current to the set value or smaller; and a constant voltage restriction section 19b configured to cause the step-up unit 19 to output predetermined voltage when the output current to be outputted from the step-up unit 19 is less than or equal to the set value, and output power, of the step-up unit 19, restricted by the constant current restriction section 19a or the constant voltage restriction section 19b may be smaller than maximum power, the maximum power being the largest consumption power of the electric motor 4. The set value and the predetermined voltage are respectively an any value and any voltage determined in accordance with designing or the like. The set value and the predetermined voltage are determined by obtaining an appropriate value and voltage through, for example, experiment and/or simulation. In this configuration, the step-up unit only needs to have a relatively small capacity, whereby the size and the cost thereof can be reduced.

The electric linear motion actuator may further include: an angle estimation device Sa configured to estimate a rotation angle of the electric motor 4; and an angular speed estimation unit 26 configured to estimate an angular speed of the electric motor 4 based on the rotation angle estimated by the angle estimation device Sa, wherein the control device 2 may further include a voltage estimation unit 22 configured to estimate voltage of the power storage unit 21, and an electric motor output restriction section 28b configured to restrict an output for the electric motor 4 based on the angular speed estimated by the angular speed estimation unit 26, the electric motor output restriction section 28b being configured to set a maximum output for the electric motor 4 to be larger when the voltage estimated by the voltage estimation unit 22 is larger.

In this configuration, the electric motor output restriction section 28b restricts the output of the electric motor 4 such that the maximum output for the electric motor 4 is larger when the estimated voltage of the power storage unit 21 is larger. By thus restricting the output of the electric motor 4 in accordance with the voltage of the power storage unit 21, it is possible to enhance the responsiveness of the electric motor 4 in a high voltage state of the power storage unit 21, and it is possible to prevent deterioration, of control stability, due to insufficient drive voltage of the electric motor 4 in a low voltage state of the power storage unit 21.

The power storage unit 21 may be a capacitor. The capacitor is preferably an electrolytic capacitor, an electric double layer capacitor, or the like, which has a relatively high capacitance per volume.

An electric brake apparatus according to the present invention may include: a brake rotor 8 linked to and rotate with a wheel; a friction member 9 configured to be brought into contact with the brake rotor 8 so as to generate braking force; an electric motor 4; a friction member actuator 6 configured to convert the output of the electric motor 4 into pressing force of the friction member 9; and a control device 2 connected to a power supply device 3 for DC power, the control device 2 being configured to drive the electric motor 4 so as to control the braking force that is generated when the friction member 9 is brought into contact with the brake rotor 8, wherein the control device 2 may include a motor driver 24 configured to control power to be supplied to a coil 4b of the electric motor 4, a power storage unit 21 connected to the power supply device 3 and the motor driver 24, a current flow direction restriction unit 20 disposed between the power supply device 3 and the power storage unit 21, the current flow direction unit 20 being configured to cause current to pass only in a direction in which power is supplied from the power supply device 3, and a step-up unit 19 configured to step up voltage from the power supply device 3 and provide the stepped-up voltage to the power storage unit 21 and the motor driver.

In this configuration, power to be supplied to the coil 4b of the electric motor 4 is controlled by the motor driver 24 based on a manipulation of a brake operation mechanism or the like of a vehicle, thereby driving the electric motor 4. The power storage unit 21 stores power supplied from the power supply device 3. In a predetermined case, the step-up unit 19 steps up voltage of the power supply device 3 and causes the power storage unit 21 to store charges. The predetermined case is a case where voltage of the power storage unit 21 is higher than voltage of the power supply device. Examples of such a case include a case where the electric motor 4 is continuously in a non-operating state, or in an operation with the power consumption of the electric motor 4 being smaller than the maximum output for the step-up unit 19.

When a manipulation that requires the electric motor 4 to perform a high-output operation is performed through a brake operation mechanism or the like in a state where the voltage of the power storage unit 21 is stepped up, power is supplied mainly from the power storage unit 21 with the stepped-up voltage via the motor driver 24 to the electric motor 4. Since the voltage of the power storage unit 21 can be thus stepped up so as to be higher than the voltage of the power supply device 3 and supplied to the motor driver 24, an instantaneous maximum output for the electric motor 4 can be increased without increasing motor current, as compared to a case where the step-up is not performed. Consequently, no expensive member such as a harness or a circuit element for large current required for increasing the motor current is necessary, whereby size reduction and cost reduction are enabled. In addition, to the electric motor 4 and the control device 2 power can also be directly supplied from the power supply device 3 without being supplied via the step-up unit 19, and thus the output of the step-up unit 19 can be made smaller than that in a conventional art example that uses a special power supply device of which the voltage is stepped up by a DC/DC converter or the like. Accordingly, the size and the cost of the step-up unit 19 can be made smaller than those in the conventional art example, whereby the size and the cost of the entire electric brake apparatus can be reduced.

The electric brake apparatus may further include a vehicle speed estimation device 30 configured to estimate a speed of a vehicle to which the electric brake apparatus 1 is mounted, wherein, in a case where the speed estimated by the vehicle speed estimation device 30 falls within a predetermined range, the control device 2 may set output voltage from the step-up unit 19 to be larger when the estimated speed is higher.

The predetermined range is a range that is freely determined in accordance with designing or the like, and is determined by obtaining an appropriate range through, for example, experiment and/or simulation. The responsiveness of an electric brake apparatus significantly influences the braking distance while the vehicle is running at high speed, and, in this configuration, the instantaneous output of the electric motor 4 can be increased as the vehicle runs at a higher speed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4B is a diagram schematically showing flow of power in a case where the battery voltage and the capacitor voltage are approximately equal to each other, in the current flow path in FIG. 3;

DESCRIPTION OF EMBODIMENTS

Figure 1:
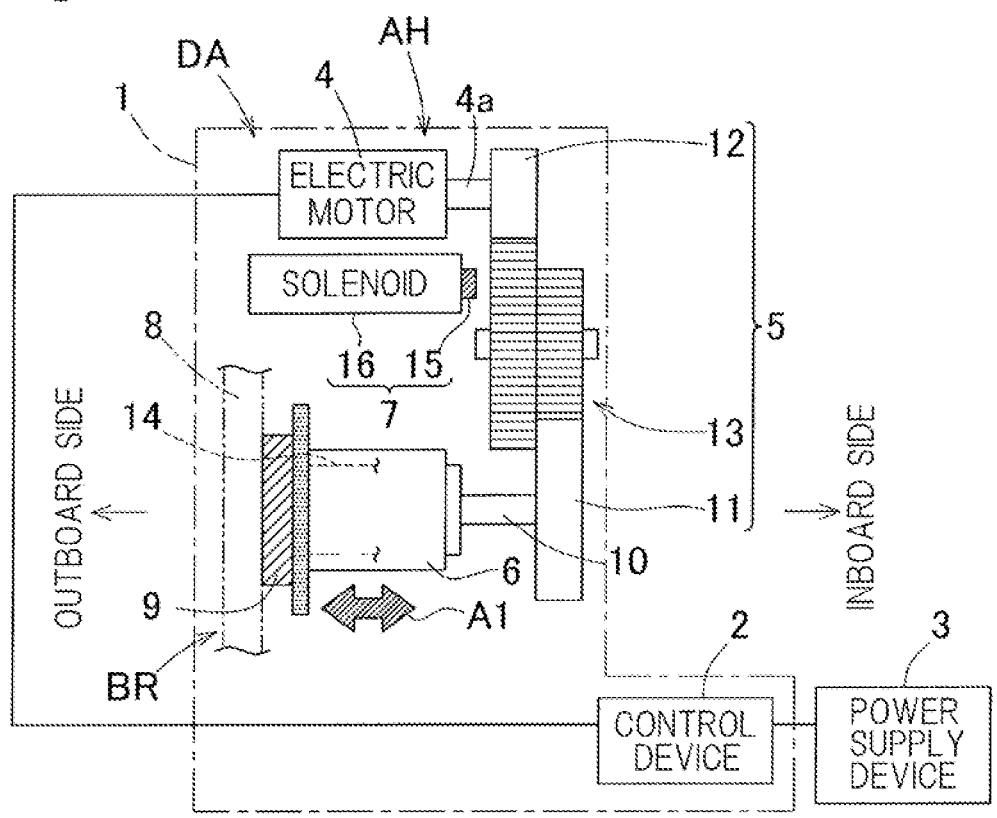
FIG. 1 is a diagram showing a schematic configuration of an electric brake apparatus according to a first embodiment of the present invention.

An electric brake apparatus according to a first embodiment of the present invention will be described with reference to FIG. 1 to FIGS. 6A and 6B. The electric brake apparatus is mounted to, for example, a vehicle. As shown in FIG. 1, the electric brake apparatus 1 includes an electric linear motion actuator DA and a friction brake BR. Firstly, the structures of the electric linear motion actuator DA and the friction brake BR will be described.

Structures of Electric Linear Motion Actuator DA and Friction Brake BR

Figure 2:
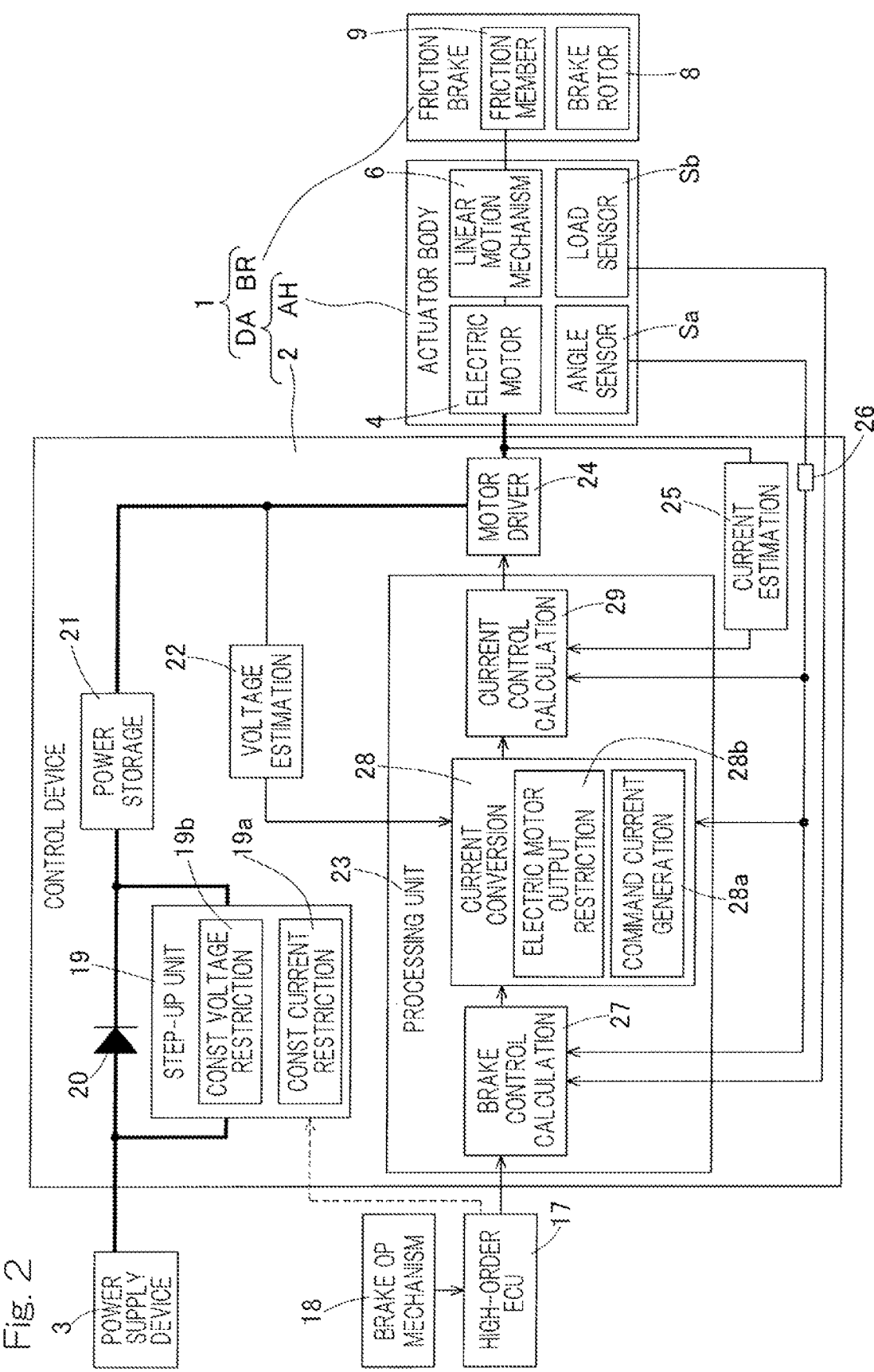
FIG. 2 is a block diagram of a control system of the electric brake apparatus in FIG. 1.

As shown in FIG. 1 and FIG. 2, the electric linear motion actuator DA includes an actuator body AH, and a control device 2, which is described later. The actuator body AH includes an electric motor 4, a speed reducing mechanism 5, a linear motion mechanism 6 serving as a friction member actuator, a parking brake mechanism 7, an angle sensor Sa, and a load sensor Sb. The electric motor 4, the speed reducing mechanism 5, and the linear motion mechanism 6 are incorporated into, for example, a housing which is not shown.

The electric motor 4 is, for example, a permanent magnet type three-phase synchronous motor. The permanent magnet type synchronous motor is preferably used since such a motor allows space saving and has high torque and high output. However, the electric motor 4 may be a reluctance motor, a DC motor with brush, or the like. Alternatively, the electric motor 4 may be an induction motor with a starter.

The friction brake BR includes a brake rotor 8, which rotates in conjunction with a wheel of the vehicle, and a friction member 9, which is brought into contact with the brake rotor 8 so as to generate braking force. The friction member 9 is disposed near the brake rotor. In the mechanism for generating braking force by frictional force, the friction member 9 may be operated by the actuator body AH so as to be pressed against the brake rotor 8.

The speed reducing mechanism 5 is a mechanism for reducing the speed of rotation of the electric motor 4, and includes a primary gear 12, an intermediate gear 13, and a tertiary gear 11. In this example, the speed reducing mechanism 5 can reduce, by means of the intermediate gear 13, the speed of rotation of the primary gear 12 mounted to a rotor shaft 4a of the electric motor 4, and transmit the rotation to the tertiary gear 11, fixed to an end portion of a rotational shaft 10. These gears 11, 12, and 13 can rotate in either direction.

The linear motion mechanism 6 is a mechanism that converts, by means of a feed screw mechanism, the rotational motion outputted from the speed reducing mechanism 5 into linear motion of a linear motion unit 14, so as to bring the friction member 9 into contact with the brake rotor 8 or separate the friction member 9 therefrom. The linear motion unit 14 is supported so as to be incapable of rotating and so as to be movable in an axial direction A1. The friction member 9 is disposed at an outboard-side end of the linear motion unit 14. By rotation of the electric motor 4 being transmitted through the speed reducing mechanism 5 to the linear motion mechanism 6, the rotational motion is converted into linear motion which is then converted into pressing force of the friction member 9, thereby generating braking force. In a state where the electric brake apparatus 1 is mounted to a vehicle, the outer side of the vehicle in the vehicle width direction is referred to as an outboard side, and the center side of the vehicle in the vehicle width direction is referred to as an inboard side.

As a parking brake actuator 16 of the parking brake mechanism 7, for example, a linear solenoid is used. A lock member 15 is advanced by the parking brake actuator 16 so as to be fitted into a locking hole (not shown) formed in the intermediate gear 13, so that the lock member 15 is locked in the locking hole (not shown). As such, the intermediate gear 13 is prevented from rotating, whereby the parking brake mechanism 7 enters a parking lock state. When the lock member 15 is disengaged from the locking hole, the intermediate gear 13 is allowed to rotate, whereby the parking brake mechanism 7 enters an unlock state.

As shown in FIG. 2, the angle sensor Sa serving as an angle estimation device estimates the rotation angle of the electric motor 4. As the angle sensor Sa, for example, a resolver, a magnetic encoder, or the like is preferably used because of high performance and high reliability thereof, but an optical encoder or the like can also be used. As the angle estimation device, an angle-sensorless estimator (not shown) for estimating a rotor phase from, for example, the relationship between voltage and current of the electric motor 4, can be provided to the control device 2 without disposing the angle sensor Sa.

The load sensor Sb is a braking force estimation device for estimating braking force, and output of the load sensor Sb is used for controlling the braking force. As the load sensor Sb, for example, a load sensor for detecting a change or a deformation in a predetermined member on which load of the linear motion mechanism 6 acts, is preferably used since such a load sensor is inexpensive. However, a configuration that does not use the load sensor Sb may be employed, and examples of such a configuration include a configuration in which the braking force is indirectly controlled on the basis of a correlation between a load and a motor current or a correlation between a load and a motor rotation angle based on the machine stiffness of the electric brake apparatus 1. Alternatively, a configuration in which the braking force is controlled with use of a braking torque sensor or an acceleration sensor, can also be employed.

Control System

FIG. 2 is a block diagram of a control system of the electric brake apparatus.

For example, each wheel is provided with a corresponding control device 2 and a corresponding actuator body AH. Each control device 2 controls a corresponding electric motor 4. The vehicle is provided with a DC power supply device 3, and a high-order ECU 17, which is a high-order control unit of the control devices 2. The power supply device 3 and the high-order ECU 17 are connected to all of the control devices 2. As the high-order ECU 17, for example, an electric control unit (VCU) for controlling the entire vehicle is used. The high-order ECU 17 has a function of performing integrated control on the control devices 2.

The power supply device 3 supplies power to the electric motors 4 and the control devices 2. The power supply device 3 may be, for example, either a low-voltage (for example, 12V) battery of the vehicle to which the electric brake apparatus 1 is mounted, or a combination of a high-voltage battery and a step-down DC/DC converter. Alternatively, the low-voltage battery, and the combination of the high-voltage battery and the step-down DC/DC converter, may be used together as the power supply device 3. Further, the power supply device 3 may include a high-capacitance capacitor, etc.

The high-order ECU 17 outputs a braking force command value to the control devices 2 in accordance with a sensor output that is dependent on an operation amount of a brake operation mechanism 18. The brake operation mechanism 18 may be, for example, a brake pedal. The brake operation mechanism 18 may include, in addition to the brake pedal, a control processing unit such as an antilock brake system (ABS). The high-order ECU 17 may not dependent on the operation of the brake operation mechanism 18, but can, for example, output the braking force command value to the control devices 2 through determination as to braking in an autonomous driving vehicle.

Each control device 2 includes a step-up unit 19, a current flow direction restriction unit 20, a power storage unit 21, a voltage estimation unit 22, a processing unit 23, a motor driver 24, a current estimation unit 25, and an angular speed estimation unit 26. The step-up unit 19 steps up the voltage of the power supply device 3 to provide the stepped-up voltage (raised voltage) to the power storage unit 21, that is, stores charges in the power storage unit 21. The step-up unit 19 may be, for example, a CVCC (constant voltage and constant current) boost converter composed of a capacitor, an inductor, a switching element, a switch control circuit, and so on.

The step-up unit 19 includes a constant current restriction section 19a and a constant voltage restriction section 19b. When output current to be outputted from the step-up unit 19 exceeds a set value, the constant current restriction section 19a restricts the output current to the set value or smaller. When the output current to be outputted from the step-up unit 19 does not exceed the set value, the constant voltage restriction section 19b causes the step-up unit 19 to output predetermined voltage. The output power, of the step-up unit 19, that is restricted by the constant current restriction section 19a or the constant voltage restriction section 19b is smaller than maximum power that can be consumed by the electric motor 4.

A large output from a step-up unit causes an exceedingly large input current value, which would require circuit elements such as an inductor to be large and expensive. However, in the configuration of the present embodiment, power of the electric motor 4 and the control device 2 can be obtained also through a circuit that is directly connected from the power supply device 3, without being supplied via the step-up unit 19. Therefore, output from the step-up unit 19 may be relatively small, whereby the aforementioned elements can be configured at low cost. For example, a brake operation is carried out in a only small fraction of a vehicle running period, and, in particular, a high-output operation performed through high-speed rotation of the electric motor 4 is required only at further limited times such as the times of an initial operation and an ABS operation when the brake pedal is rapidly pressed downward. Therefore, no operational problem is considered to arise even if the output of the step-up unit 19 is made small as described above.

The current flow direction restriction unit 20 is disposed between the power supply device 3 and the power storage unit 21 so as to be in parallel to the step-up unit 19. The current flow direction restriction unit 20 prevents current flow from the power storage unit 21 to the power supply device 3. The current flow direction restriction unit 20 performs an operation of a diode, and thus denoted by the symbol for a diode element in FIG. 2. When being implemented, the current flow direction restriction unit 20 may be an actual diode, or an equivalent diode composed of a switching element and a switch control circuit. In a case where the equivalent diode is used as the current flow direction restriction unit 20, the switch control circuit may be a passive circuit in which the switching element is controlled in accordance with, for example, voltage at a predetermined position on a current flow path, or an active circuit that controls the switching element in accordance with a current flow situation by means of an operation unit or the like.

The power storage unit 21 is connected between the power supply device 3 and the motor driver 24. The power storage unit 21, for example, may be a capacitor. The power storage unit 21 is preferably an electrolytic capacitor, an electric double layer capacitor, or the like, which has a relatively high capacitance per volume. The capacitor may not be configured as described in the present embodiment. The capacitor is preferably configured to be usable also as a smoothing capacitor of a general PWM drive circuit, which avoids significant increase in cost or the like. However, a special capacitor or battery can also be provided to achieve a special power storage unit.

The voltage estimation unit 22 estimates voltage of the power storage unit 21. The voltage estimation unit 22 is preferably composed of, for example, an A/D converter and a voltage-dividing circuit configured with resistance elements since, if so composed, the voltage estimation unit 22 is inexpensive.

The processing unit 23 includes a brake control calculation section 27, a current conversion section 28, and a current control calculation section 29. The processing unit 23 is, for example, a processor such as a microcomputer, or a hardware module such as an ASIC.

The brake control calculation section 27 can be configured as a control system that calculates a motor torque value (target torque) for converging, to a predetermined value, a feedback value that can correspond to braking force on the basis of a predetermined braking force command value (target braking force) obtained from the high-order ECU 17. Examples of the feedback value include one or both of a motor angle estimated by the angle sensor Sa and a load detected by the load sensor Sb. For control calculation by the brake control calculation section 27, the brake control calculation section 27 may be configured as a control system that uses feedback control or feedforward control or uses feedback control and feedforward control in combination.

The current conversion section 28 includes a command current generation section 28a and an electric motor output restriction section 28b. The command current generation section 28a converts, in order to achieve the target torque obtained by the brake control calculation section 27, the target torque into a predetermined target current, i.e., a command current value. The electric motor output restriction section 28b restricts the value of current to a predetermined value on the basis of a limit of a maximum power consumption or a maximum current for the electric motor 4.

The command current generation section 28a and the electric motor output restriction section 28b of the current conversion section 28 preferably perform the process by using, for example, a lookup table (LUT) that enables a command current value to be acquired on the basis of the target torque and an angular speed of the electric motor 4, which reduces calculation load. However, the command current value and a maximum current value may be obtained on the basis of a predetermined calculation formula. The angular speed of the electric motor 4 is estimated by the angular speed estimation unit 26. The angular speed estimation unit 26 can calculate the angular speed by, for example, differentiating the motor angle estimated by the angle sensor Sa.

The electric motor output restriction section 28b increases a maximum output for the electric motor as the voltage estimated by the voltage estimation unit 22 increases. The maximum output restricts the output of the electric motor 4. Since the electric motor output restriction section 28b changes the maximum output for the electric motor 4 when the drive voltage is changed, this restriction is preferable in terms of improvement of responsiveness. For the electric motor output restriction section 28b, a three-dimensional LUT using angular speed, target torque, and drive voltage as reference parameters is preferably used, for example. The angular speed is estimated by the angular speed estimation unit 26, the target torque is obtained from the brake control calculation section 27, and the drive voltage is obtained from the voltage estimation unit 22.

The current control calculation section 29 can be configured as a control system that calculates a voltage value for converging, to a predetermined value, a feedback value that can correspond to current on the basis of the predetermined target current obtained from the current conversion section 28. As the feedback value, a current estimated by the current estimation unit 25 described later is used. For control calculation by the current control calculation section 29, the current control calculation section 29 may be configured as a control system that uses feedback control or feedforward control or uses feedback control and feedforward control in combination. The control calculation may also be performed in a synchronous orthogonal coordinate system of, for example, d-axis current and q-axis current. The voltage value may be a voltage value that has been converted so as to have a three-phase PWM duty ratio after being calculated in the synchronous orthogonal coordinate system.

The motor driver 24 controls power that is supplied to coils 4b (FIG. 3) of the electric motor 4, by adjusting switching patterns of DC voltage and the electric motor 4. The motor driver 24 is preferably configured as a circuit that controls voltage on the basis of the ON-OFF duty ratio of a switching element such as a field effect transistor (FET), with use of a half-bridge circuit or the like using the switching element, for example, since the motor driver 24 so configured is inexpensive.

The current estimation unit 25 is configured to estimate a current value of the electric motor 4. The current estimation unit 25, for example, may include a non-contact current sensor for detecting a magnetic field generated near a current flow path of a power-transmission line between the motor driver 24 and the electric motor 4, or a current sensor that uses a shunt resistance and an amplifier. The current estimation unit 25 may employ, for example, a method in which a current value is estimated from a voltage across both ends of the switching element of the motor driver 24. The current value may be estimated by detecting currents for all of three phases (U phase, V phase, and W phase). Alternatively, three phase currents may be estimated by detecting currents for two phases and calculating a current for the remaining one phase on the basis of the relationship in which the total sum of currents for three phases equals zero. Alternatively, three phase currents may be estimated from the switching patterns of three phases or the like through detection of a current for one phase on the primary high side or low side of the motor driver 24.

The functional blocks in FIG. 2 are given merely for convenience of explaining functions. Thus, in implementation of the functional blocks, the manner of division into functions does not necessarily have to be the same as that in FIG. 2, but, as necessary, a plurality of the blocks may be unified or one block may be divided into smaller functions. In addition, components which are not shown, e.g., a redundant system and other sensors such as a thermistor, may be appropriately provided as necessary.

Configuration of Motor Power Circuit

Figure 3:
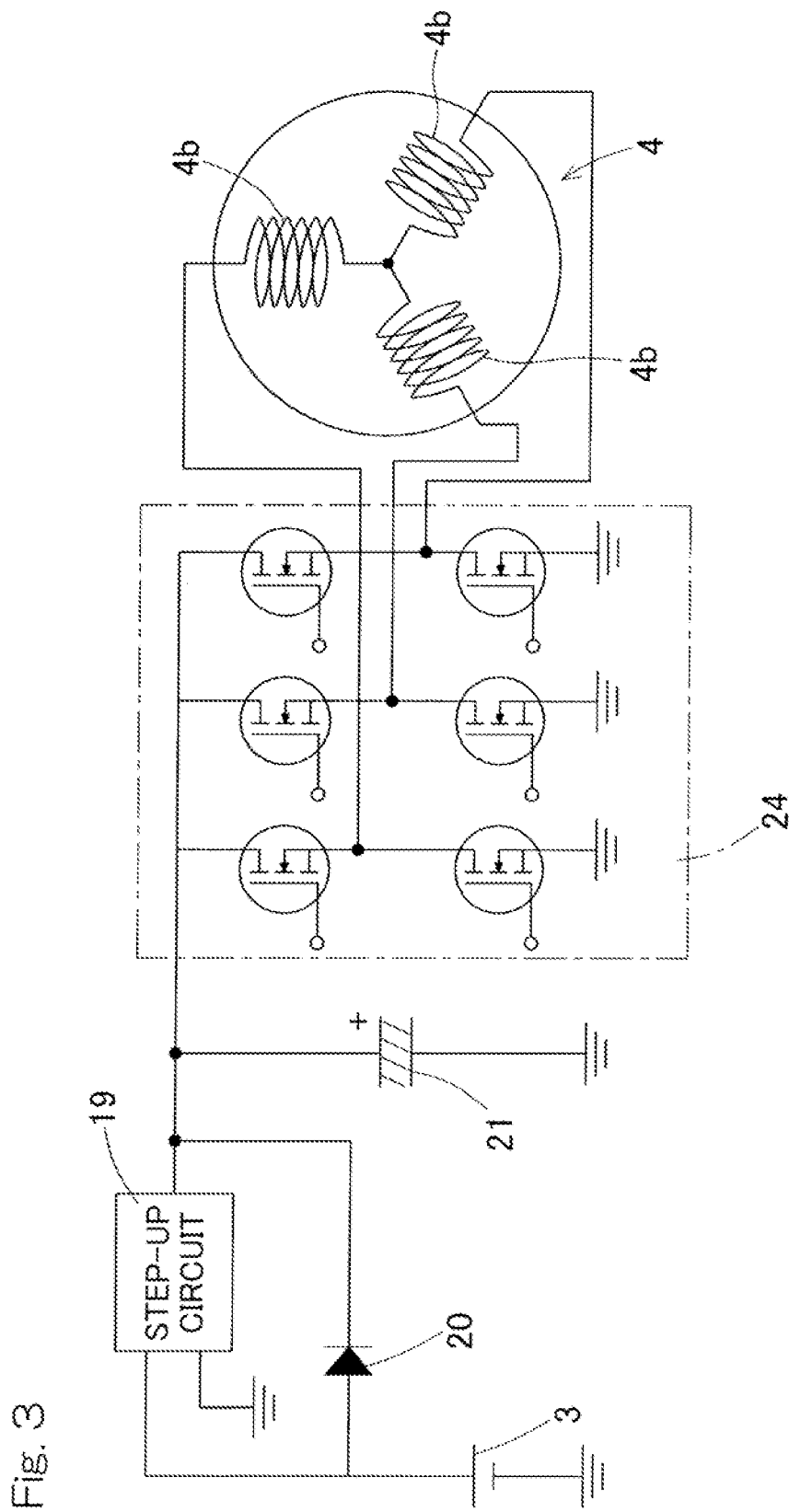
FIG. 3 is a diagram schematically showing a current flow path for motor drive power in the electric brake apparatus in FIG. 1.

FIG. 3 schematically shows a current flow path, for motor drive power, that includes the power supply device 3, the step-up unit 19, the current flow direction restriction unit 20, the power storage unit 21, the motor driver 24, and the electric motor 4 in FIG. 2. In FIG. 3, a battery, a step-up circuit (CVCC), a diode element, a capacitor, and a half-bridge circuit group using n-ch FETs correspond to the power supply device 3, the step-up unit 19, the current flow direction restriction unit 20, the power storage unit 21 and the motor driver 24, respectively. Besides the above, for example, a protection circuit which is not shown, such as a snubber circuit for reducing surge voltage that is caused by switching of the FETs, may be disposed.

Figure 4A:
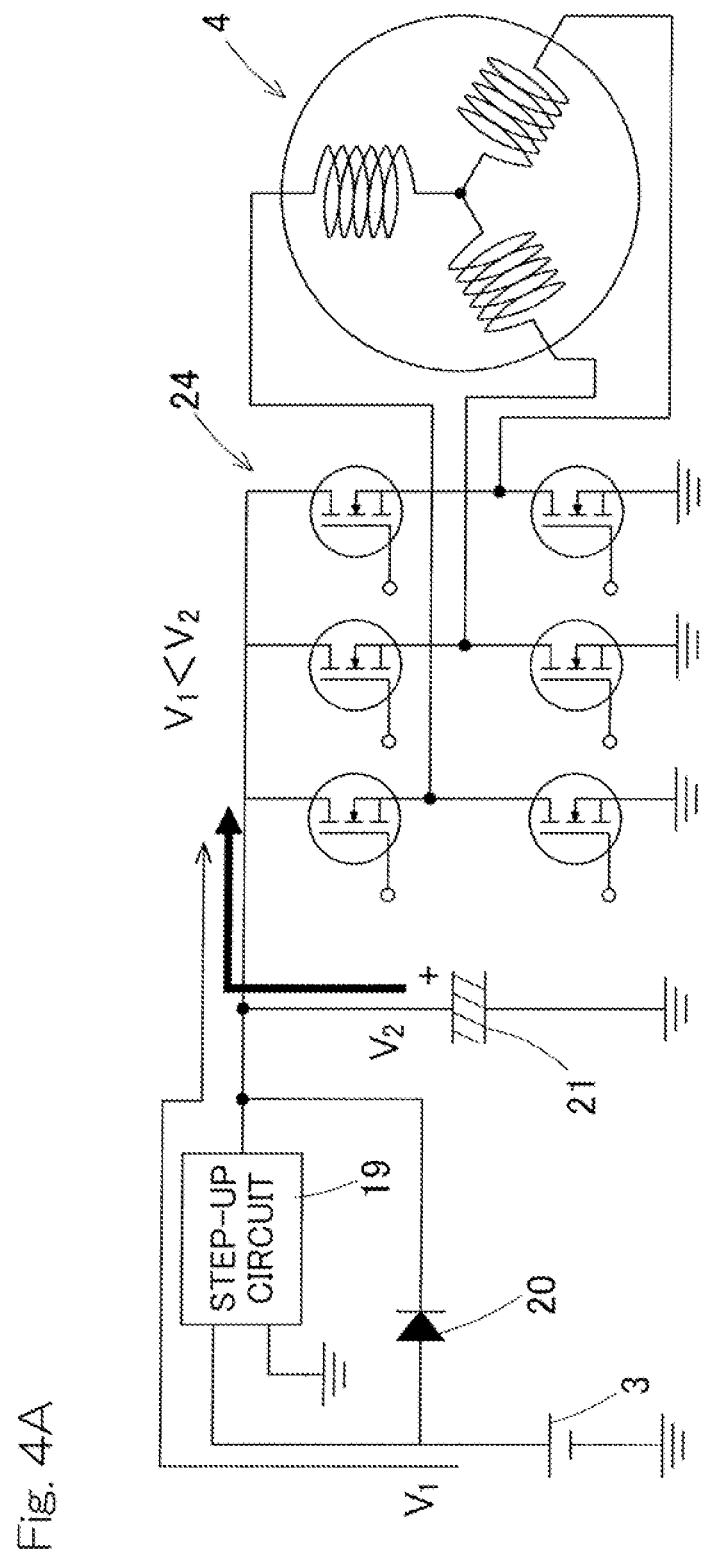
FIG. 4A is a diagram schematically showing flow of power in a case where capacitor voltage is higher than battery voltage, in the current flow path in FIG. 3.

FIG. 4A is a diagram schematically showing flow of power in a case where a capacitor voltage V2 (a voltage of the capacitor) is higher than a battery voltage V1 (a voltage of the battery), that is, (V1<V2) is satisfied, in FIG. 3. FIG. 4A indicates a schematic diagram of flow of power in a case of V1<V2, specifically, in a case where the electric motor 4 performs a high-output operation (rapid braking manipulation) under a state where the electric motor 4 is continuously in a non-operating state or in an operation with low output and the capacitor has a high voltage because of the step-up circuit. The thickness of each arrow in FIG. 4A is proportional to the magnitude of power, and power is supplied mainly from the capacitor with the stepped-up voltage to the electric motor 4. The arrows in FIG. 4A merely indicate general flow of power, and do not indicate, for example, instantaneous flow of power such as instantaneous feedback current flowing via a free wheel diode of an FET when a high-side arm is OFF during PWM drive.

FIG. 4B indicates a schematic diagram of flow of power in a case where V1 is approximately equal to V2, specifically, in a case where the electric motor 4 performs the high-output operation under a state where the potential of the capacitor is approximately equal to the potential of the battery after charges of the capacitor have been released. The thickness of each arrow in FIG. 4B is proportional to the magnitude of power, and power is supplied mainly from the battery to the electric motor 4. For example, if the state shown in FIG. 4A continues, the amount of charges released from the capacitor to the motor exceeds the amount of charges supplied to the capacitor through the step-up circuit, which may cause the state shown in FIG. 4B. It is indicated that, in this situation, power is supplied mainly from the battery (power supply device 3) to the electric motor 4.

Operation Example of Electric Brake Apparatus

Figure 5A:
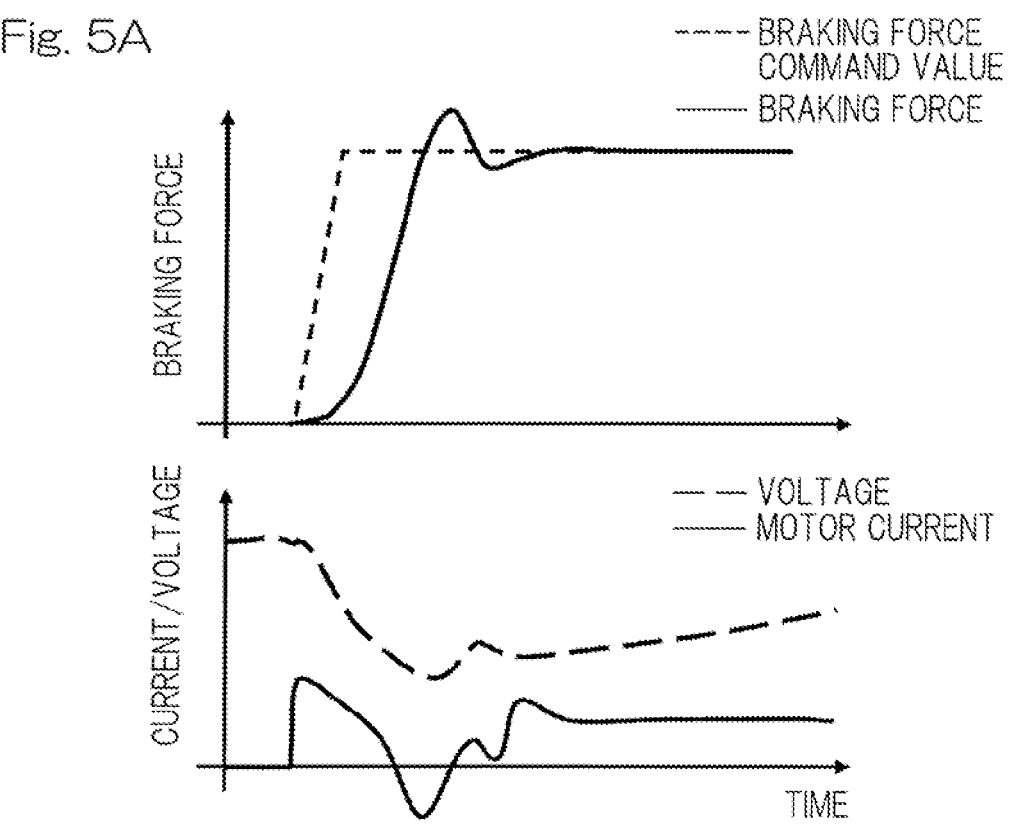
FIG. 5A is a diagram showing an operation example at the time of a rapid braking manipulation in the electric brake apparatus in FIG. 1, and, in the diagram, an upper graph indicates time-dependent change in braking force and a lower graph indicates time-dependent changes in current and voltage.
Figure 5B:
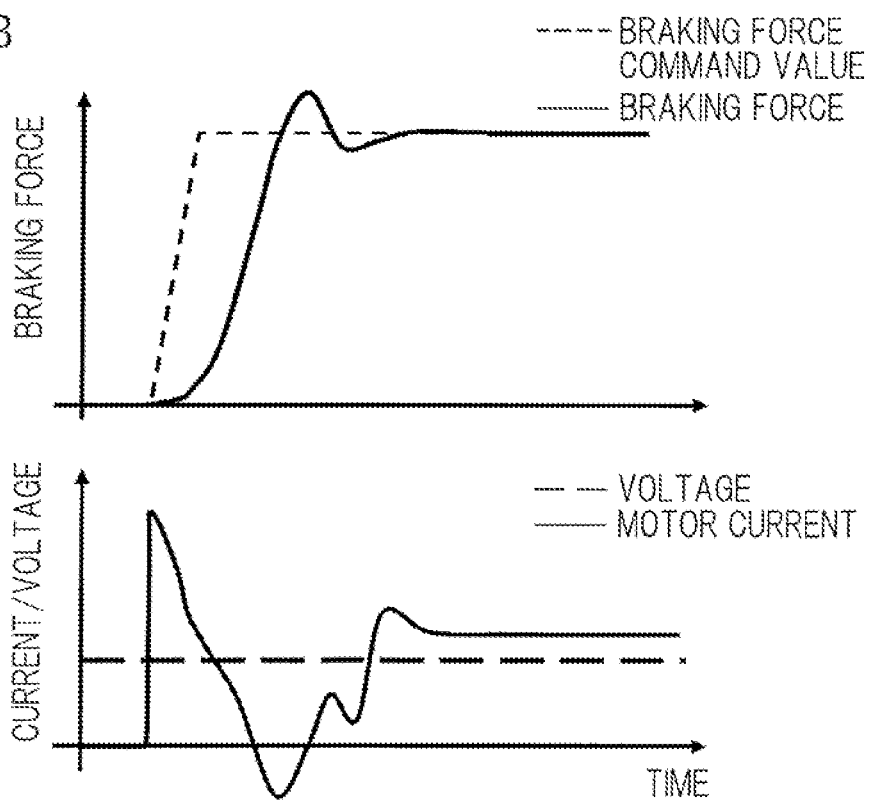
FIG. 5B is a diagram showing an operation example at the time of a rapid braking manipulation in the electric brake apparatus in FIG. 1 having a conventional configuration, and, in the diagram, an upper graph indicates time-dependent change in braking force and a lower graph indicates time-dependent changes in current and voltage.

FIG. 5A is a diagram showing an operation example at the time of a rapid braking manipulation in the electric brake apparatus, and FIG. 5B is a diagram showing an operation example at the time of a rapid braking manipulation in a conventional configuration (specifically, a configuration in which a motor driver is connected only to a power supply device). In an upper graph in each drawing, the braking force command value is represented by a dotted line, and the braking force is represented by a solid line. In a lower graph of each drawing, the voltage is represented by a dashed line, and the motor current is represented by a solid line. The same applies to FIG. 6A and FIG. 6B.

In an example in FIG. 5A, a high output is achieved at an initial stage of the operation in FIG. 5A through the power storage unit of which the voltage has been stepped-up in advance. As such, the maximum current in the example in FIG. 5A is smaller than that in an example in FIG. 5B. Therefore, a harness, a contact, another circuit element, and the like can be configured so as to have small sizes at low cost.

Figure 6A:
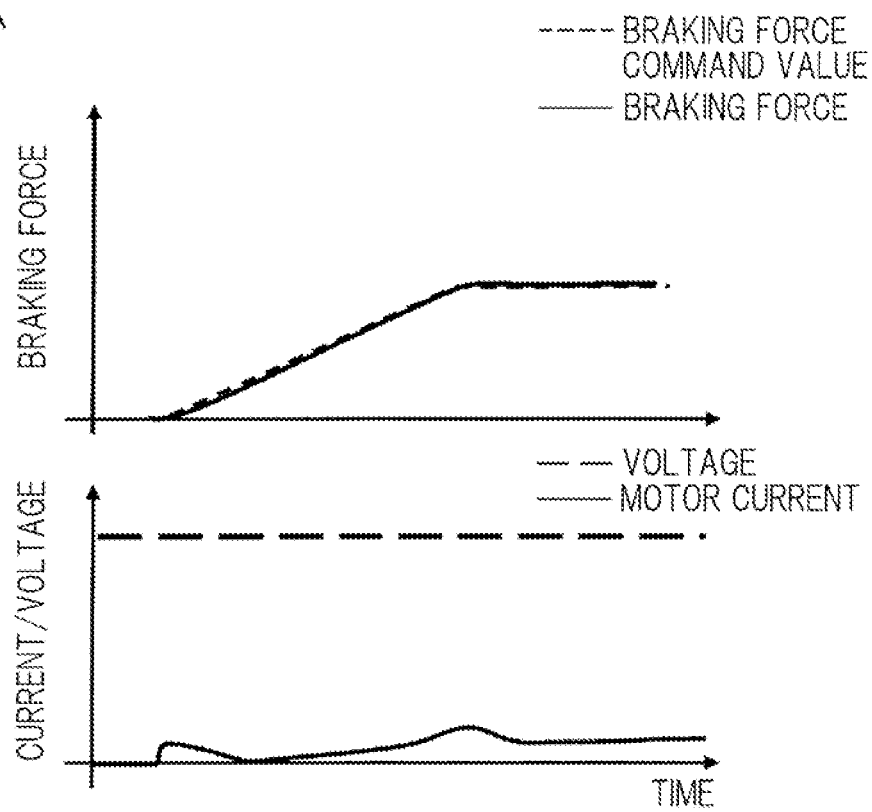
FIG. 6A is a diagram showing an operation example at the time of a gentle braking manipulation in the electric brake apparatus in FIG. 1, and, in the diagram, an upper graph indicates time-dependent change in braking force and a lower graph indicates time-dependent changes in current and voltage.
Figure 6B:
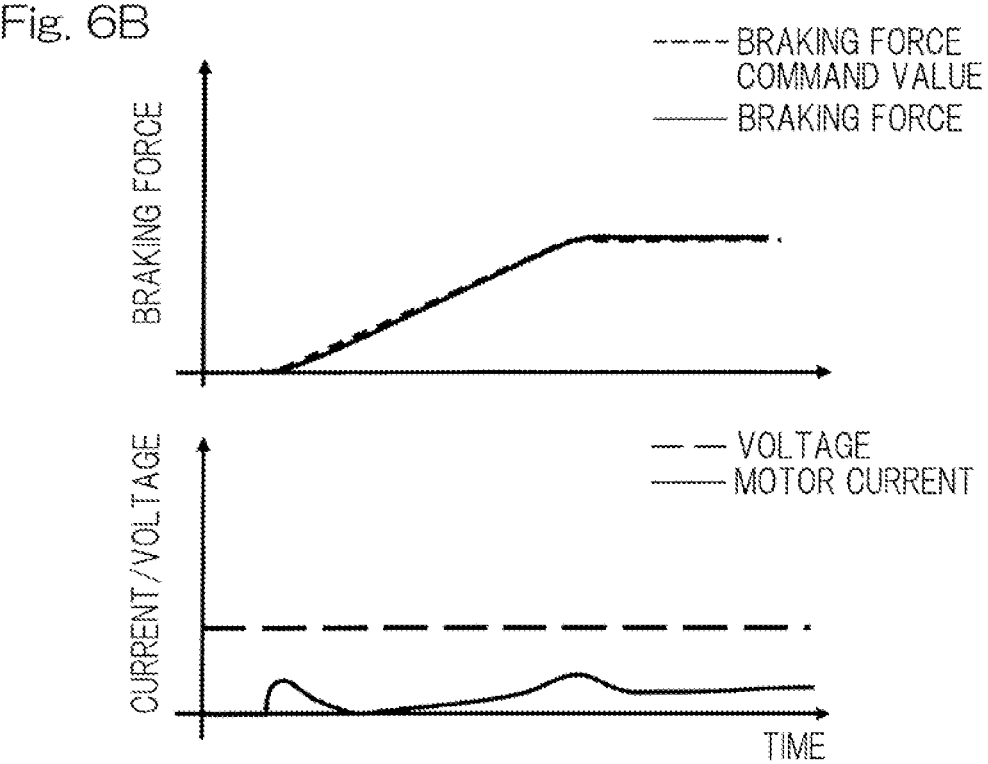
FIG. 6B is a diagram showing an operation example at the time of a gentle braking manipulation in the electric brake apparatus in FIG. 1 having the conventional configuration, and, in the diagram, an upper graph indicates time-dependent change in braking force and a lower graph indicates time-dependent changes in current and voltage.

FIG. 6A is a diagram showing an operation example at the time of a gentle braking manipulation in the electric brake apparatus, and FIG. 6B is a diagram showing an operation example at the time of a gentle braking manipulation in the conventional configuration (specifically, the configuration in which the motor driver is connected only to the power supply device). In examples of the gentle braking manipulations shown in FIG. 6A and FIG. 6B, there is substantially no difference in operation between the operation example in the electric brake apparatus and the operation example in the conventional configuration.

Effects

According to the electric linear motion actuator DA and the electric brake apparatus 1 described above, when a manipulation that requires the output of the electric motor 4 to be instantaneously increased is performed under a state where the power storage unit 21 has a stepped-up voltage, power is supplied mainly from the power storage unit 21 with the stepped-up voltage via the motor driver 24 to the electric motor 4. Thus, instantaneous power can be outputted from the power storage unit 21 with the stepped-up voltage, which enables the output of the electric motor 4 to be instantaneously increased without increasing the motor current. Consequently, a harness, a connector, and the like which are needed to increase the motor current are not necessary, and thus cost can be accordingly reduced.

To the electric motor 4 and the control device 2 normal power is directly supplied from the power supply device 3 without being supplied via the step-up unit 19, which makes the output of the step-up unit 19 smaller than that in a conventional art example in which a step-up circuit is used as a special power supply device. Therefore, the sizes of a wire and the like can be made smaller than those in the conventional art example, whereby the size and the cost of the entire actuator can be reduced. In addition, since the output of the step-up unit 19 can be made small, increase in the cost can be suppressed.

The power storage unit 21A may be a capacitor, especially an electrolytic capacitor, an electric double layer capacitor, or the like, which is particularly preferable since such a capacitor has a relatively high capacitance per volume. In particular, increase in the cost can be suppressed by using a smoothing capacitor directly connected to the electric motor 4.

Other Embodiments

In the following description, components corresponding to the matters described in the preceding embodiments are denoted by the same reference numerals, and the redundant description thereof is omitted. When only a part of a configuration is described, the remaining part of the configuration is the same as that described in the preceding embodiments unless otherwise specified. The same advantageous effects are achieved from the same configuration. In addition to the combinations of portions described specifically in each embodiment, it is also possible to partially combine the embodiments unless any problem is particularly posed due to the combination.

Figure 7:
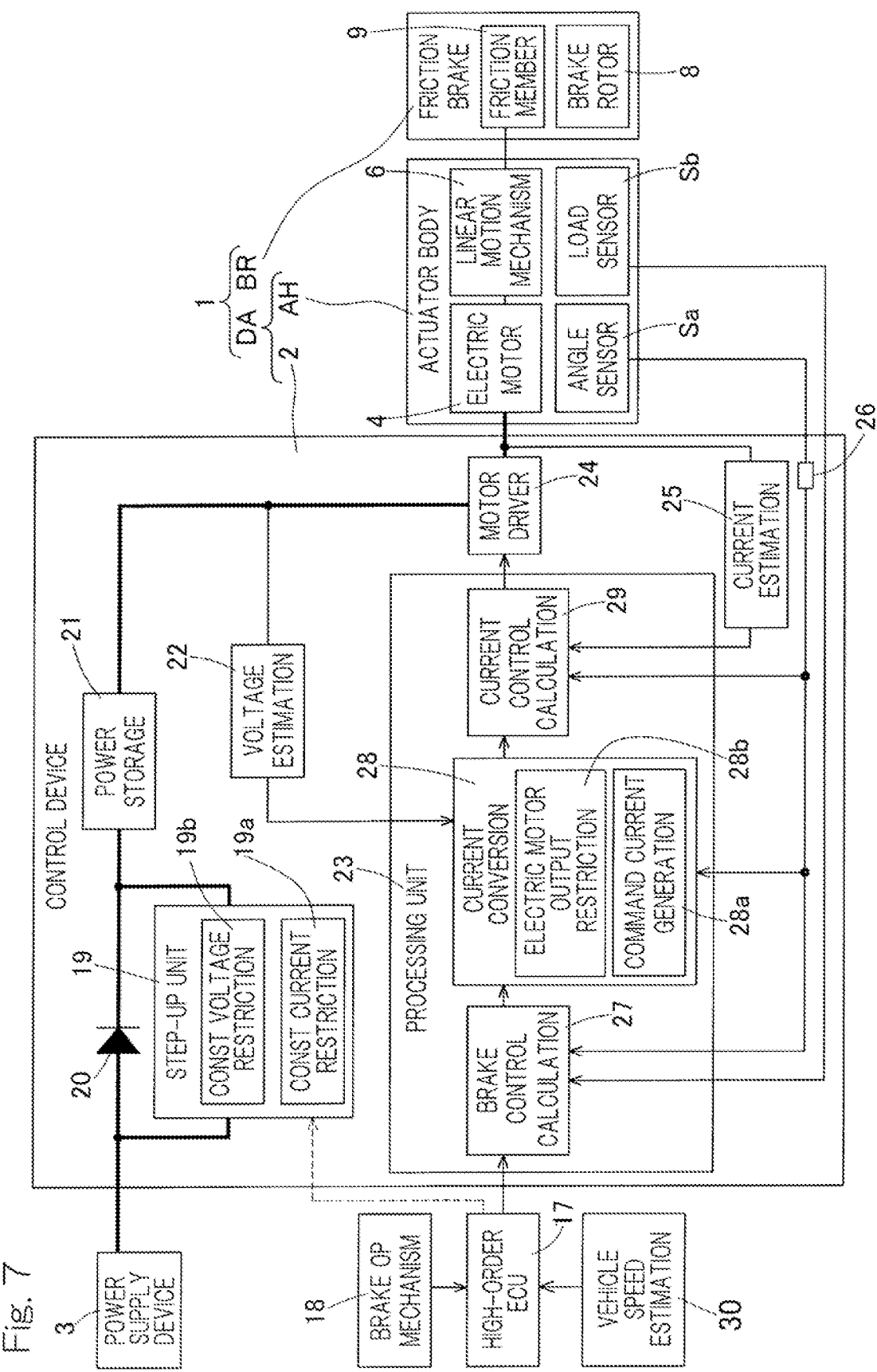
FIG. 7 is a block diagram of a control system of an electric brake apparatus according to a second embodiment of the present invention.

As shown in FIG. 7, a vehicle to which the electric brake apparatus 1 is mounted, includes a vehicle speed estimation device 30 for estimating the speed of the vehicle (vehicle speed). In a case where the vehicle speed estimated by the vehicle speed estimation device 30 falls within a predetermined range, the control device 2 may increase output voltage from the step-up unit 19 as the estimated vehicle speed becomes higher. In this case, the instantaneous output of the electric motor 4 can be increased as the vehicle speed becomes higher. Accordingly, the braking force of the vehicle can be enhanced.

In the above-described embodiments, when an antilock brake (ABS) signal is inputted to the control device 2 under a state where the power storage unit 21 has the stepped-up voltage, the control device 2 may cause power to be supplied mainly from the power storage unit 21 with the stepped-up voltage via the motor driver 24 to the electric motor 4.

As a conversion mechanism portion of the linear motion mechanism 6, various screw mechanisms such as a planetary roller or a ball screw, a tilt-utilizing mechanism such as a ball ramp, or the like can be used.

The electric linear motion actuator in the embodiments are applicable also to apparatuses other than the electric brake apparatus, and examples of such apparatuses include a press apparatus.

Although the present invention has been fully described in connection with the preferred embodiments thereof with reference to the accompanying drawings, numerous additions, changes, or deletions can be made without departing from the gist of the present invention. Therefore, such additions, changes, and deletions are also construed as included within the scope of the present invention.

REFERENCE NUMERALS

1 . . . electric brake apparatus
2 . . . control device
3 . . . power supply device
4 . . . electric motor
4b . . . coil
6 . . . linear motion mechanism (friction member actuator)
14 . . . linear motion unit
19 . . . step-up unit
20 . . . current flow direction restriction unit
21 . . . power storage unit
24 . . . motor driver

What is claimed is:

1. An electric linear motion actuator comprising:
an electric motor;
a linear motion mechanism configured to convert rotational motion of the electric motor into linear motion of a linear motion unit via a rotation input/output shaft; and
a control device connected to a power supply device for DC power, the control device being configured to drive the electric motor,
wherein the control device includes,
a motor driver configured to control power to be supplied to a coil of the electric motor,
a power storage unit connected between the power supply device and the motor driver,
a current flow direction restriction unit disposed between the power supply device and the power storage unit, the current flow direction restriction unit being configured to cause current to pass only in a direction in which power is supplied from the power supply device, and
a step-up unit configured to step up voltage from the power supply device and provide the stepped-up voltage to the power storage unit,
wherein the step-up unit includes:
a constant current restriction section configured to restrict, when output current to be outputted from the step-up unit is greater than a set value, the output current to the set value or smaller; and
a constant voltage restriction section configured to cause the step-up unit to output predetermined voltage when the output current to be outputted from the step-up unit is less than or equal to the set value, and wherein
output power, of the step-up unit, restricted by the constant current restriction section or the constant voltage restriction section is smaller than maximum power, the maximum power being the largest consumption power of the electric motor.

2. The electric linear motion actuator as claimed in claim 1, wherein the power storage unit is a capacitor.

3. An electric brake apparatus comprising:
the electric linear motion actuator as claimed in claim 1;
a brake rotor linked to and rotate with a wheel; and
a friction member configured to be brought into contact with the brake rotor so as to generate braking force, wherein
the linear motion mechanism includes a friction member actuator, the friction member actuator being configured to convert the output of the electric motor into pressing force of the friction member, and
the control device drives the electric motor so as to control the braking force, the braking force being generated when the friction member is brought into contact with the brake rotor.

4. The electric brake apparatus as claimed in claim 3, the electric brake apparatus further comprising
a vehicle speed estimation device configured to estimate a speed of a vehicle to which the electric brake apparatus is mounted, wherein,
in a case where the speed estimated by the vehicle speed estimation device falls within a predetermined range, the control device sets output voltage from the step-up unit so as to increase as the estimated speed increases.

5. An electric linear motion actuator comprising:
an electric motor;
a linear motion mechanism configured to convert rotational motion of the electric motor into linear motion of a linear motion unit via a rotation input/output shaft; and
a control device connected to a power supply device for DC power, the control device being configured to drive the electric motor,
wherein the control device includes,
a motor driver configured to control power to be supplied to a coil of the electric motor,
a power storage unit connected between the power supply device and the motor driver,
a current flow direction restriction unit disposed between the power supply device and the power storage unit, the current flow direction restriction unit being configured to cause current to pass only in a direction in which power is supplied from the power supply device, and
a step-up unit configured to step up voltage from the power supply device and provide the stepped-up voltage to the power storage unit,
the electric linear motion actuator further comprising:
an angle estimation device configured to estimate a rotation angle of the electric motor; and
an angular speed estimation unit configured to estimate an angular speed of the electric motor based on the rotation angle estimated by the angle estimation device,
wherein the control device further includes,
a voltage estimation unit configured to estimate voltage of the power storage unit, and
an electric motor output restriction section configured to restrict an output for the electric motor based on the angular speed estimated by the angular speed estimation unit, the electric motor output restriction section being configured to set a maximum output for the electric motor to be larger when the voltage estimated by the voltage estimation unit is larger.

6. The electric linear motion actuator as claimed in claim 5, wherein the power storage unit is a capacitor.

7. An electric brake apparatus comprising:
the electric linear motion actuator as claimed in claim 5;
a brake rotor linked to and rotate with a wheel; and
a friction member configured to be brought into contact with the brake rotor so as to generate braking force, wherein
the linear motion mechanism includes a friction member actuator, the friction member actuator being configured to convert the output of the electric motor into pressing force of the friction member, and the control device drives the electric motor so as to control the braking force, the braking force being generated when the friction member, and the control device drives the electric motor so as to control the braking force, the braking force being generated when the friction member is brought into contact with the brake rotor.

\* \* \* \* \*